United States Patent [19]

Ogawa et al.

[11] Patent Number: 5,538,762
[45] Date of Patent: Jul. 23, 1996

[54] METHOD OF MANUFACTURING A FLUOROCARBON-BASED COATING FILM

[75] Inventors: Kazufumi Ogawa, Hirakata; Mamoru Soga, Osaka, both of Japan

[73] Assignee: Matsushita Electric Industrial Co., Ltd., Osaka, Japan

[21] Appl. No.: 312,185

[22] Filed: Sep. 26, 1994

Related U.S. Application Data

[60] Continuation of Ser. No. 52,913, Apr. 27, 1993, abandoned, which is a division of Ser. No. 774,827, Oct. 11, 1991, Pat. No. 5,240,774.

[30] Foreign Application Priority Data

Oct. 25, 1990 [JP] Japan .................. 2-289127

[51] Int. Cl.$^6$ .................................... B05D 3/06
[52] U.S. Cl. .................. 427/503; 427/536; 427/539; 427/409; 427/412.1; 427/419.7
[58] Field of Search .................. 428/448; 427/419.8, 427/419.7, 419.1, 412.1, 409, 539, 537, 535, 551, 503, 536

[56] References Cited

U.S. PATENT DOCUMENTS

| | | | |
|---|---|---|---|
| 4,368,476 | 12/1983 | Uehara et al. | 346/140 R |
| 4,539,061 | 3/1985 | Sagiv | 427/407.1 |
| 4,673,474 | 6/1987 | Ogawa | 204/157.64 |
| 4,810,564 | 3/1989 | Takahashi et al. | 428/448 |
| 4,863,794 | 5/1989 | Fujii et al. | 427/407.2 |
| 4,961,996 | 10/1990 | Carre et al. | 428/421 |

FOREIGN PATENT DOCUMENTS

| | | |
|---|---|---|
| 363924 | 11/1989 | European Pat. Off. |
| 367438 | 5/1990 | European Pat. Off. |
| 386784 | 9/1990 | European Pat. Off. |

OTHER PUBLICATIONS

Abstract of JP 61–016910, Jan. 1986.
World Patents Index Latest, Derwent Publications Ltd., London, GB; AN 86–065417 & JP-A-61 016 910 (Hitachi Cable KK), Jan. 24, 1986 (abstract).

*Primary Examiner*—Shrive Beck
*Assistant Examiner*—Erma Cameron
*Attorney, Agent, or Firm*—Fish & Richardson

[57] ABSTRACT

A method of contacting a substrate having a surface containing hydroxyl groups with a non-aqueous solution containing a material having a chrolosilyl group; washing if desired; coating the substrate with a non-aqueous solvent containing a compound having a fluorocarbon group and a chlorosilane group or a solvent containing a compound containing a fluorocarbon group and an alkoxysilane; and baking the substrate if necessary in order to form a fluorocarbon-based polymer coating film chemically bonded to the substrate surface. The hydroxyl groups on the substrate surface and chlorosilyl groups are reacted to form a thin film having a large number of silanol groups (—SiOH) capable of connecting the polymer coating film to the substrate to form a heat-, weather-, and wear-resistant film on various surfaces.

11 Claims, 6 Drawing Sheets

METHOD OF MANUFACTURING A FLUOROCARBON-BASED COATING FILM

This application is a continuation of U.S. application Ser. No. 08/052,913, filed Apr. 27, 1993, now abandoned, which was a division of application Ser. No. 07/774,827, filed Oct. 11, 1991, now U.S. Pat. No. 5,240,774.

FIELD OF THE INVENTION

This invention relates to a method of manufacturing a fluorocarbon-based polymer coating film used on an apparatus or the like requiring a heat-resistant, weather-resistant and wear-resistant coating. The coating can be used on electric apparatuses, such as hot plates and rice cooking machines; vehicles; and industrial apparatus.

BACKGROUND OF THE INVENTION

Fluorocarbon-based polymer coating films have been used extensively and are manufactured by making the surface of an Al substrate rough by means of a brush or chemical etching; coating the rough surface with a primer or the like; coating with a paint suspending fine particles of a fluorocarbon-based material, such as polytetrafluoroethylene in ethanol or the like; and then drying and baking at about 400° C. for about one hour to fix the fluorocarbon-based polymer to the substrate surface of the material.

This method of manufacture is simple. However, since the polymer and substrate are bonded together merely by an anchor effect, there is a limit to the adhesion of the polymer to the substrate. The method is insufficient in view of adhesion and mechanical strength as a method of manufacturing fluorocarbon-based coating films used for apparatus or the like requiring a heat-resistant, weather-resistant and wear-resistant coating. Such electric apparatus include hot plates and rice cooking apparatus; vehicles; and industrial apparatus.

SUMMARY OF THE INVENTION

In view of the above drawbacks in the prior art method, it is an object of the present invention to form a fluorocarbon-based coating layer or film having satisfactory adhesion to a substrate that is pinhole-free, thereby improving the performance of an apparatus or the like requiring a heat-resistant, weather-resistant and wear-resistant coating. Such electric apparatuses include hot plates and rice cooking apparatus; vehicles; and industrial apparatus.

The primary objective of this invention is to provide a fluorocarbon-based polymer coating film comprising at least an siloxane film formed as a inner layer and a fluorocarbon-based polymer film formed as an outer layer on the surface of a substrate. The substrate surface and the inner layer are bonded with covalent bonds, and the inner layer and the outer layer are bonded with covalent bonds.

Another objective of this invention is to provide a method of manufacturing a fluorocarbon-based polymer coating film comprising the steps of contacting a substrate having hydroxyl groups on a surface with a non-aqueous solvent containing a material with a chlorosilyl group; coating said substrate surface with either a non-aqueous solvent containing a compound having a fluorocarbon group and a chlorosilyl group or a solvent containing a compound having a fluorocarbon group and alkoxysilane group or a compound represented by the following formula where n represents 0 or an integer; R represents an alkyl group or a hydrocarbon substituted group containing C=C, C≡C, a silicon atom or an oxygen atom; m represents 0 or 1; Y represents a hydrogen atom, an alkyl group, an alkoxy group, a fluorine-containing alkoxy group or a fluorine-containing alkyl group; A represents a hydrogen atom; and q represents 0, 1 or 2; and, and baking the substrate after the contacting and coating steps.

Another objective of this invention is to provide a method of manufacturing a fluorocarbon-based polymer coating film comprising the steps of contacting a substrate having a surface containing hydroxyl groups with a non-aqueous solvent containing a material having a chlorosilyl group; washing the substrate with a non-aqueous solvent to remove the material without reaction; coating the substrate with either a non-aqueous solvent containing a compound having a fluorocarbon group and a chlorosilyl group or a solvent containing a compound having a fluorocarbon group and alkoxysilyl group.

It is preferable in this invention that both sets of the covalent bonds connecting the substrate surface and the inner layer, and the inner layer and thed outer layer are siloxane bonds.

It is preferable in this invention that the inner layer is formed with a siloxane-based monomolecular film.

It is preferable in this invention that the substrate is made from a member of a group consisting of metals, ceramics and plastics.

It is preferable in this invention that the substrate is made of a plastic material treated in a plasma atmosphere containing oxygen.

It is preferable in this method invention that the material having a chlorosilyl group contains a member of a group consisting of $SiCl_4$, $SiHCl_3$, $SiH_2Cl_2$ and $Cl—(SiCl_2O)_n—SiCl_3$ (n being an integer, preferably 1 to 3).

It is preferable in this method invention that the compound having a fluorocarbon group and a chlorosilyl group is represented by a formula: $CF_3—(CF_2)_n—(R)_m—SiX_pCl_{3-p}$ where n represents 0 or an integer; R represents an alkyl group or a hydrocarbon substituted group containing C=C, C≡C, a silicon atom or a hydrogen atom; m represents 0 or 1; X represents a hydrogen atom, an alkyl group, an alkoxy group, a fluorine-containing alkoxy group or a fluorine-containing alkyl group; p represents 0, 1 or 2.

It is preferable in this method invention that the compound having a fluorocarbon group and an alkoxysilane group is represented by a formula:

where n represents 0 or an integer; R represents an alkyl group or a hydrocarbon substituted group containing C=C, C≡C, a silicon atom or an oxygen atom; m represents 0 or 1; Y represents a hydrogen atom, an alkyl group, an alkoxy group, a fluorine-containing alkoxy group or a fluorine-containing alkyl group; OA' represents an alkoxy group; and q represents 0, 1 or 2.

It is preferable in this method invention that the material represented by a formula: $SiX_sCl_{4-s}$ where X represents a hydrogen atom or an alkyl group, and s represents 0, 1 or 2; is added to a non-aqueous solvent containing a compound having a fluorocarbon group and a chlorosilyl group.

It is preferable in this method invention that the material represented by a formula: $SiY_t(OA")_{4-t}$ where Y represents an alkyl group; A" represents a hydrogen atom or an alkyl group; and t represents 0, 1 and 2; is added to solvent containing a compound having a fluorocarbon group and an alkoxysilane group.

It is preferable in this method invention that fine particles of a fluorocarbon-based polymer are dispersed in advance in either the non-aqueous solvent containing a compound having a fluorocarbon group and a chlorosilyl group or the solvent containing a compound having a fluorocarbon group and an alkoxysilane group.

DETAILED DESCRIPTION OF THIS INVENTION

A special feature of manufacturing a fluorocarbon-based coating film, which comprises the steps: contacting a substrate having a surface containing hydroxyl groups with a non-aqueous solvent containing a material having a chlorosilyl group; coating the substrate surface with either a non-aqueous solvent containing a compound having a fluorocarbon group and a chlorosilyl group or a solvent containing a compound having a fluorocarbon group; and alkoxysilane group and baking the substrate after the contacting and coating steps.

A washing step for removing the excess material by washing may be provided between the contacting step and the coating step.

According to the invention, in the step of contacting a substrate having a surface containing hydroxyl groups with a non-aqueous solvent containing a material having a plurality of chlorosilyl groups, the hydroxyl groups on the substrate surface and chlorosilyl groups of the material having chlorosilyl groups are reacted to form on the substrate a thin film having a number of silanol (—SiOH) groups capable of being strongly chemically bonded to the substrate surface.

In addition, after the step of contacting the substrate with a non-aqueous solvent containing a material having chlorosilyl groups, in which the hydroxyl groups on the substrate surface and the chlorosilyl groups of the material are reacted, and the step of removing the non-reacted excess material containing a plurality of chlorosilyl groups remaining on the substrate by washing with non-aqueous organic solvent and by further washing with water, only the material bonded to —OH groups on the substrate can form a siloxane-based monomolecular film (inner layer) containing silanol groups (—SiOH).

Further, after the coating step, in which the substrate is coated with a non-aqueous solvent containing a compound having a fluorocarbon group and a chlorosilane group or with a solvent containing a compound having a fluorocarbon group and an alkoxysilane group, by baking the coating together with the substrate in a moist atmosphere for 1 hour at about 120° C., a hydrochloric acid removal or alcohol removal reaction during a precipitation step occurs between the mutual chlorosilane groups or alkoxysilane groups in the compound, and between the chlorosilane groups or alkoxysilane groups in the compound, and the —SiOH groups of a thin film formed on the substrate surface. This forms a fluorocarbon-based polymer coating film (outer layer) of a polymer having fluorocarbon groups that is chemically bonded via —SiO— bonds to a thin film formed on the substrate surface and having a large number of —SiOH bonds.

It is thus possible to form a fluorocarbon-based polymer coating film having very excellent adhesion.

For the substrate having a surface containing hydroxyl groups according to the invention, metal and non-metal elements and ceramics may be used.

According to the invention, since hydrophilic groups formed on the substrate and chlorosilyl groups are reacted with each other, where metals are used, commonly termed base metals, such as aluminum, copper and iron, are suitable.

Further, a material without any oxide film such as plastic substrates can be used after surface treatment to render them hydrophilic. The surface treatment may be carried out by usual means, such as treatment in a plasma atmosphere containing oxygen at 100 W, for 20 minutes or a corona treatment. However, plastics that contain —NH groups such as polyamid or polyurethane substrates, do not require surface oxygen treatment. Since —NH groups have active hydrogen, it is easy to remove hydrochloric acid with chlorosilyl groups of the surface active agents.

As the material containing chlorosilyl groups, $SiCl_4$, $SiHCl_3$, $SiH_2Cl_2$ and $Cl—(Si\ Cl_2O)_n—SiCl_3$ (n being an integer, preferably 1 to 3) may be used.

When a material having a plurality of chlorosilyl groups in molecule is used, such as $Cl—(SiCl_2\ O)_n—SiCl_3$, the number of silanol groups on the surface is increased which improve the hydrophilic effect.

As the compound having a fluorocarbon group and a chlorosilane group, those which may be used are represented by a formula; $CF_3—(CF_2)_n—(R)_m—SiX_pCl_{3-p}$ where n represents 0 or an integer; R represents an alkyl group or a hydrocarbon substituted group containing C=C, C≡C, a silicon atom or an oxygen atom; m represents 0 or 1; X represents a hydrogen atom, an alkyl group, an alkoxy group, a fluorine-containing alkoxy group or a fluorine-containing alkyl group; and p represents 0, 1 or 2.

As the compound having a fluorocarbon group and an alkoxysilane group, those which may be used are represented by a formula:

$$CF_3—(CF_2)_n—(R)_m—SiY_q(OA')_{3-q}$$

where n represents 0 or an integer; R represents an alkyl group or a hydrocarbon substituted group containing C=C, C≡C, a silicon atom or an oxygen atom; m represents 0 or 1; Y represents a hydrogen atom, an alkyl group, an alkoxy group, a fluorine-containing alkoxy group and a fluorine-containing alkyl group, OA' represents an alkoxy group, and q represents 0, 1 or 2.

To harden the fluorocarbon-based polymer coating film to be formed, a cross-linking agent can be added.

More specifically, in the case where a non-aqueous solvent containing a compound having a fluorocarbon group and a chlorosilane group is used, a cross-linking which may be used is represented by a formula; $SiX_sCl_{4-s}$, where X represents a hydrogen group or a substituted group, such as an alkyl group; and s represents 0, 1 or 2. In the case of using a solvent containing a compound having a fluorocarbon group and an alkoxysilane group, a cross-linking agent which may be used is represented by a formula: $SiY_t(OA'')_{4-t}$, where Y represents a substituted group, such as an alkyl group; A" represents a hydrogen atom or an alkyl group; and t represents 0, 1 and 2. In either case, it is possible to adjust the three-dimensional cross-linking degree in the fluorocarbon-based polymer coating film that is formed, thus controlling the hardness of the fluorocarbon-based coating film.

Furthermore, it is possible to coat in ways similar to the prior art fluorocarbon-based coating film by dispersing fine particles of the fluorocarbon-based polymer in a non-aqueous solvent containing a compound having a fluorocarbon group and a chlorosilane group or in a solvent containing a compound having a fluorocarbon group and an alkoxysilane group. In this case, fluorocarbon chains, siloxane bonds and molecular chains of the fluorocarbon-based polymer entangle on a molecular level with each other. Thus, a fluorocarbon-based polymer coating film may be formed, that has very high adhesion compared to the prior art coating film.

The invention can widely be applied to substrates, such as materials made of metals, ceramics or plastics, wood, stone, etc. The surface of the substrates can also be coated with paints or the like.

Examples of cutlery include: a kitchen knife, scissors, a knife, a cutter, a graner, a razor, hair clippers, a saw, a plane, a chisel, a gimlet, a badkin, bite (cutting tools), the edge of a drill, the edge of a mixer and juicer, a blade of a mill, a blade of a lawnmower, a punch, a straw cutter, a staple of a stapler, a can opener or a surgical knife and the like.

Examples of needles include: an acupuncture needle, a needle, a sewing needle, a matting needle, an injection needle, a surgical needle, a safety pin, and the like.

Examples of products in the pottery (ceramics) industry include: products made of a pottery, a glass, ceramics and enameled products. This further includes, for example, sanitary potteries (a chamber pot, a wash-bowl, a bathtub etc.), tablewares (a rice-bowl teacup, a dish (plate), a bowl, a teacup, a glass, a bottle, a coffee-pot (siphon), a pan, an earthenware mortar, a cup and the like), vases (a flower bowl, a flowerpot, a bud vase and the like), water tanks (a breeding cistern, an aquarium water tank and the like), chemical experiment appliances (a beaker, a reactor vessel, a test tube, a flask, a laboratory dish, condenser, a mixing rod, stirrer, a mortar, a bat, a syringe etc.) a roof tile, enameled ware, an enameled washbowl, and an enameled pan and the like.

Examples of mirrors include: a hand mirror, a full-length mirror, a bathroom mirror, a lavatory mirror, vehicle mirrors (a rear-view mirror, a side mirror, a door mirror etc.), half mirror, road mirrors such as a curve mirror, a show window glass, a salesroom in the department store, medical care mirrors, a concave mirror, a convex mirror and the like.

Examples of molding parts includes: dies for press molding, dies for cast molding, dies for injection molding, dies for transfer molding, dies for compression molding, dies for transfer molding, dies for inflation molding, dies for vacuum molding, dies for blow forming, dies for extrusion molding, dies for fiber spinning, a calender processing roll and the like.

Examples of ornaments include: a watch, a jewel, a pearl, a sapphire, a ruby, an emerald, a garnet, a cat's eye, a diamond, a topaz, a bloodstone, an aquamarine, a turquoise, an agate, a marble, an amethyst, a cameo, an opal, a crystal, a glass, a ring, a bracelet, a brooch, a tiepin (a stickpin), an earring, a necklace, jewelry made of platinum, gold, silver, copper, aluminium, titanium, tin and those alloy, stainless steel, a glass frame and the like.

Examples of forming molds for food include: cake, cookies, bread-baking, chocolate, jelly, ice cream, ovenware, an ice tray and the like.

Examples of cookware include: kitchen utensils (a pan and a pot), a kettle, a pot, a frying-pan, a hot plate, a toasting net, a takoyaki plate and the like.

Examples of papers include: photogravure paper, hydrophobic and oilphobic paper, poster paper, high-grade pamphlet paper, wrapping paper, package paper, drinking package paper, container paper, printing paper, synthtic insulating paper and the like.

Examples of resin(s) include: a polyolefin such as a polypropylene and polyethylen, a polyvinylchloride plastic, a polyamide, a polyimide, a polyamideimide, a polyester, an aromatic polyester, a polycarbonate, a polystyrene, a polysulfide, a polysulfone, a polyethersulfone, a polyphenylensulfide, a phenolic resin, a furan resin, a urea resin, an epoxy resin, a polyurethane, a silicon resin, an ABS resin, a methacrylic resin, an acrylate resin, a polyacetal, a polyphenylene oxide, a polymethylpentene, a melamine resin, an alkyd resin, an unsaturated polyester cured resin and the like.

Examples of rubber(s) include: styrene-butadiene rubber, butyl rubber, nitril rubber, chloroprene rubber, polyurethane rubber, silicon rubber and the like.

Examples of household electrical appliances include: a television, a radio, a taperecorder, an audio, a compact disc (CD), a refrigerator of freezing machines, a freezer, an air conditioner, a juicer, a mixer, a blade of an electric fan, a lighting apparatus, a dial plate, a hair dryer for perms and the like.

Examples of sports articles include: skis, fishing rods, poles for polevaulting, boats, yachts, surfboards, golf balls, bowling balls, fishing line (yarn), fishing nets, floats and the like.

Examples applying to vehicle parts include:

(1) ABS resin: a lamp cover, an installment pannel, trimming parts, a protector for a motorcycle.

(2) Cellulose plastic: a car mark, a steering wheel (3) FRP (fiber reinforced plastics): a bumper, an engine cover (jacket)

(4) Phenolic resin: a brake (5) Polyacetal: wiper gear, a gas valve (6) Polyamide: a radiator fan (7) Polyarylate (polycondensation polymerization by bisphenol A and pseudo phtalic acid): a direction indicator lamp (or lense), a cowl board lense, a relay case (8) Polybutylene terephtalate (PBT): a rear end, a front fender (9) Poly(amino-bismaleimide): engine parts, a gear box, a wheel, a suspension drive system (10) Methacrylate resin: a lamp cover lens, a meter pannel and its cover, center mark (11) Polypropylene: a bumper (12) Polyphenylene oxide: a radiator grille, a wheel cap (13) polyurethane: a bumper, an fender, a installment panel, a fan (14) Unsaturated polyester resin: a body, a fuel tank, a heater housing, a meter panel.

Examples of office supplies include: a fountain pen, a ball-point pen, a propelling pencil (an automatic or a mechanical pencil), a pencil case, a binder, a desk, a chair, a bookshelf, a rack, a telephone stand table, a ruler (measure), a drawing instrument and the like.

Examples of building materials include: materials for a roof, and outer wall and interiors. Roof materials include a brick, a slate and a tin (a galvanized iron sheet) and the like. Other wall materials include wood (including a processed manufactured wood), mortar, concrete, ceramics sizing, a metallic sizing, a brick, a stone, plastics and a metal like aluminium. Interior materials such as a wood (including a processed one), a metal like aluminum, plastics, paper, fiber and the like.

Examples of building stones include: granite, marble and others used as building material, such as an architecture, an ornament, a bath, a grave, a monument, a gatepost, a stone wall, a paving stone and the like.

Examples of musical instruments and sound apparatus include: a percussion instrument, a stringed instrument, a keyboard instrument, a woodwind instrument, the brass and others, and sound apparatus such as a microphone, a speaker. To be concrete, there are musical instruments such as a drum, a cymbal, a violin, a cello, a guitar, a koto (harp), a piano, a flute, a clarinet, a bamboo flute and a horn, and sound apparatus such as a microphone, a speaker and a earphone and the like.

Examples also include a thermos bottle, a vacuum bottle, a vacuum vessel and the like.

Examples also include a high resistance voltage insulator, such as a power supplying insulator or a spark plug, which require a highly hydrophobic, oilphobic and prevention of contamination coating.

As has been described in the foregoing, the method of manufacturing a fluorocarbon-based coating film according to the invention comprises the steps contacting a substrate having a surface containing hydroxyl groups with a non-aqueous solution containing a material containing a chlorosilyl group; coating the substrate with a non-aqueous solution containing a compound containing a fluorocarbon group and a chlorosilane group or a solution containing a compound containing a fluorocarbon group and an alkoxysilane group; and baking the substrate after the contacting and coating steps. Thus, a fluorocarbon-based coating film excellent in the hydrophobic and oil-repellent properties can be formed on the surface of a hydrophilic substrate with the properties being strongly chemically bonded to the substrate, high density, no pinholes, uniform thickness and very thin layer. It is thus possible to provide a fluorocarbon-based coating film having high durability and high performance.

Now, examples will be described with reference to FIGS. 1 to 4.

EXAMPLE 1

Figure 1A:
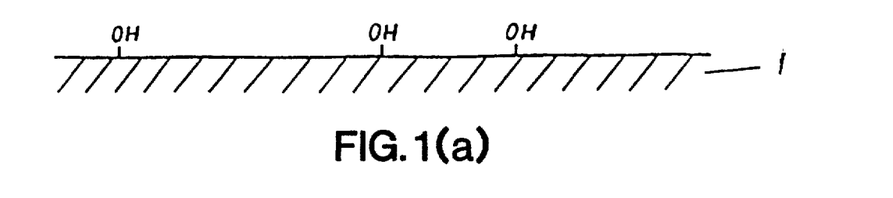
FIG. 1(a) is a schematic sectional view, enlarged in scale to the molecular level showing the surface of a substrate of Example 1 of this invention.

A hydrophilic substrate 1, i.e., a glass substrate, was prepared as shown in FIG. 1(a).

The substrate 1 was coated with what was obtained by dissolving 1% wt of Cl—(SiCl$_2$O)$_2$—SiCl$_3$ as the material having a chlorosilyl group in chloroform solvent.

Also, hydrophilic —OH substitute groups were contained on the surface of the substrate 1. Thus, a hydrochloric acid removal reaction (dehydrochloric acid) was brought about on the surface to fix molecules to the surface of the substrate 1 via —SiO— bonds, for example as shown by the formula [1];

formula [1]

Figure 1B:
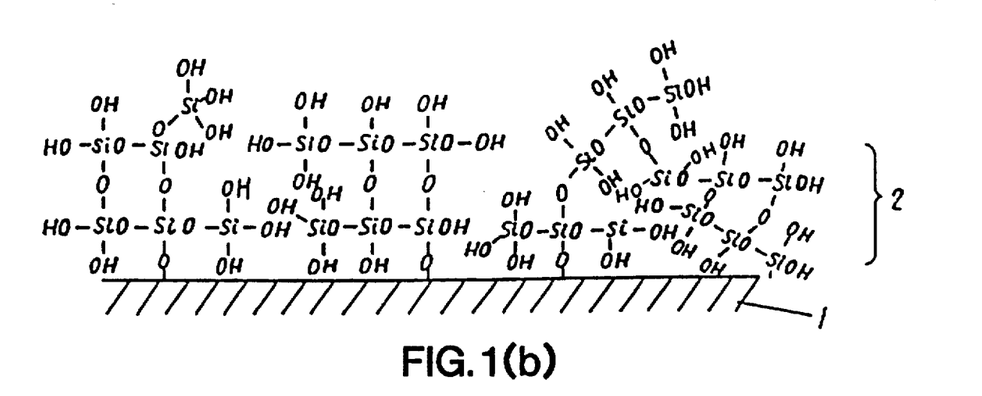
FIG. 1(b) is a schematic sectional view, enlarged in scale to the molecular level showing the siloxane polymer film (inner layer) on the surface of a substrate of Example 1 of this invention.

With subsequent evaporation of the chloroform solvent in an atmosphere containing moisture from water content, a siloxane polymer coating film 2 as shown in FIG. 1(b) was formed with hydrochloric acid removal reaction between the moisture and —Cl groups without being reacted with the substrate 1.

The siloxane polymer coating film 2 thus formed was bonded to the surface of the substrate 1 via chemical bonds of —SiO— and thus difficult to be separated.

The siloxane polymer coating film 2 had a large number of —SiOH bonds on the surface.

Figure 1C:
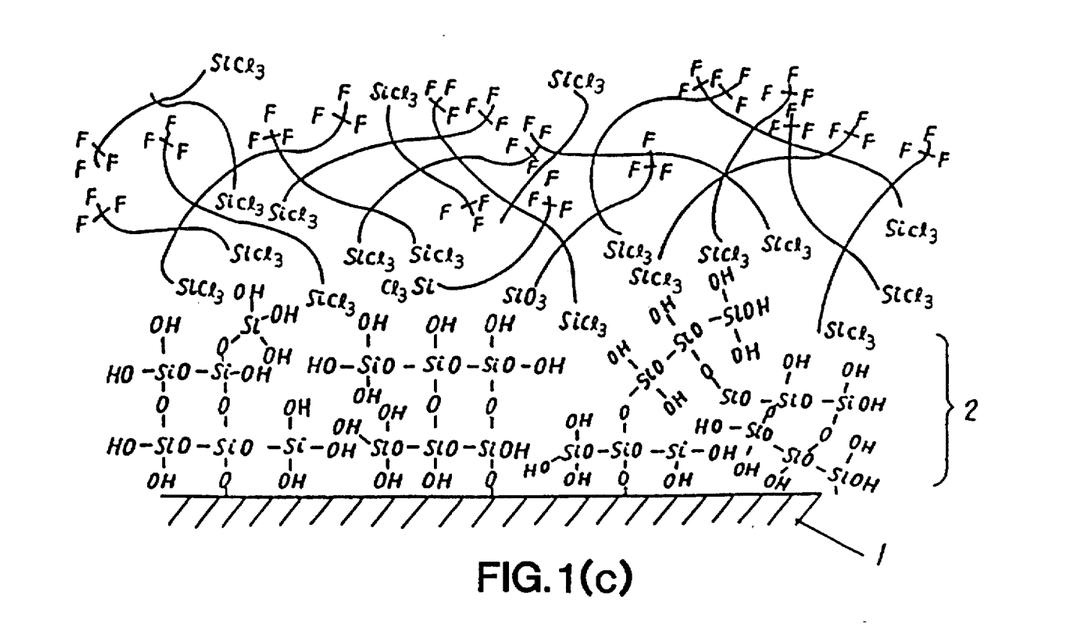
FIG. 1(c) is a schematic sectional view, enlarged in scale to the molecular level showing the fluorocarbon-based monomolecular coating film on the siloxane polymer film (inner layer) of Example 1 of this invention.

Accordingly, a solution containing 80% wt n-hexadecane, 12% wt carbon tetrachloride and 8% wt chloroform was prepared by dissolving into a concentration of 2.0% wt CF$_3$CH$_2$O(CH$_2$)$_{15}$SiCl$_3$ as a non-aqueous solvent containing a compound having a fluorocarbon group and a chlorosilane group, and it was coated on the surface of the substrate 1 having the surface thereof formed with the siloxane polymer coating film 2 having a large number of —SiOH bonds, as shown in FIG. 1(c). Then, by baking in an atmosphere containing water moisture at 200° C. for about 30 minutes, a hydrochloric acid removal reaction was brought about between the chlorosilyl groups of fluorine-containing chlorosilane-based surface active agent and exposed —OH groups of the siloxane polymer coating film 2 to form covalent bonds such as the following formula[2];

$$CF_3CH_2O(CH_2)_{15}SiCl_3 + 3(-OH) \longrightarrow \quad \text{formula [2]}$$

Figure 1D:
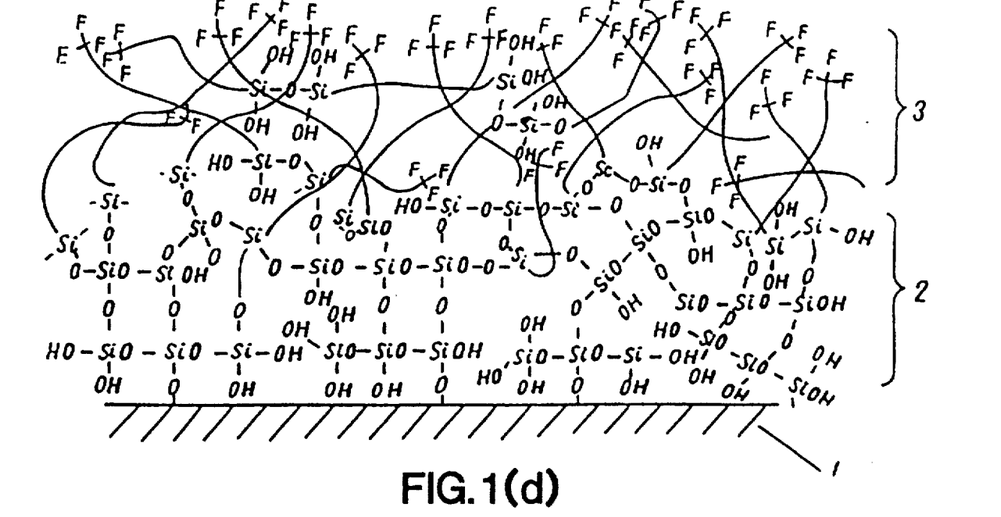
FIG. 1(d) is a schematic sectional view, enlarged in scale to the molecular level showing the fluorocarbon-based polymer (outer layer) and siloxane polymer film (inner layer) on the surface of a substrate of Example 1 of this invention.

In this way, a fluorocarbon-based polymer coating film 3 having a thickness of about 10 to 20 μm was obtained.

This polymer film 3 was not separated at all in a checkerboard test.

Further, by adding 3% wt of $SiCl_4$ as a cross-linking agent to the non-aqueous solution containing a compound having a fluorocarbon group and a chlorosilane group, a fluorocarbon-based coating polymer film 3 was obtained, which had about two times of the hardness of a solvent without $SiCl_4$, caused by three-dimensional cross-linking through —Si(—O—)$_3$ bonds.

Further by carrying out similar coating by adding 20% wt of fine particles of polytetrafluoroethylene as fluorocarbon-based polymer to the non-aqueous solvent containing a compound having a fluorocarbon group and a chlorosilane group, a fluorocarbon-based coating film was obtained, which had very superior adhesion as compared to that in the prior art even though its hardness was comparable to that in the prior art.

EXAMPLE 2

Figure 2A:
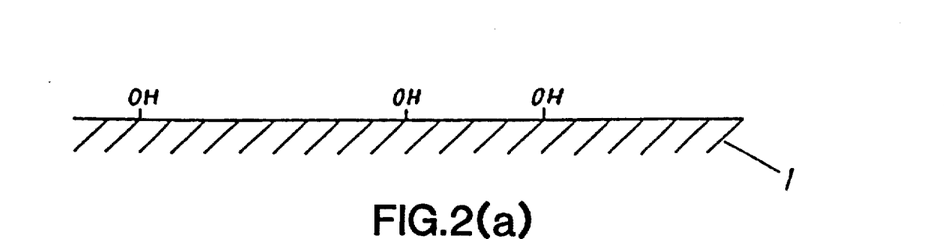
FIG. 2(a) is a schematic sectional view, enlarged in scale to the molecular level showing the surface of a substrate of Example 2 of this invention.

A hydrophilic substrate 1 was prepared as same as in Example 1, as shown in FIG. 2(a).

The substrate 1 was dipped for about one hour in a solution obtained by dissolving 1% wt of Cl—(SiCl$_2$O)$_2$—SiCl$_3$ as a material having chlorosilyl groups in chloroform solvent as in Example 1. A hydrochloric acid removal reaction thus was brought about on the surface of the substrate 1 because of the presence of hydrophilic —OH groups on the surface to adsorb molecules as shown above formula[1].

Figure 2B:
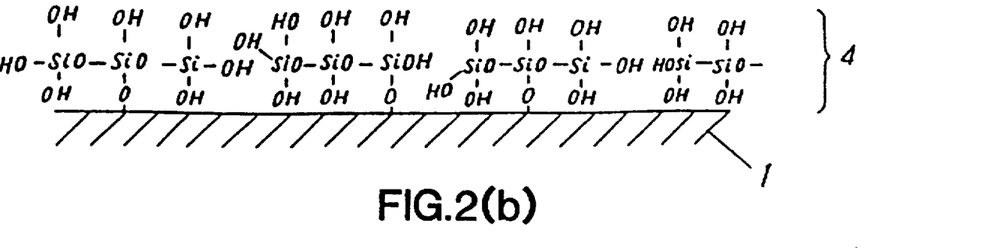
FIG. 2(b) is a schematic sectional view, enlarged in scale to the molecular level showing the siloxane monomolecular film (inner layer) on the surface of a substrate of Example 2 of this invention.

By subsequently carrying out washing with a non-aqueous solvent, i.e., chloroform, and then with water, molecules of Cl—(SiCl$_2$O)$_2$—SiCl$_3$ which remained without being reacted with the substrate 1, were removed to leave a siloxane monomolecular film 4 on the surface of the substrate 1 as shown in FIG. 2(b) and given as the formulas [A] and/or [B] etc.

The monomolecular film 4 thus obtained was perfectly bonded to the substrate 1 via chemical bonds of —SiO— and was not easy separated.

The monomolecular film thus formed has many —SiOH bonds on the surface.

Figure 2C:
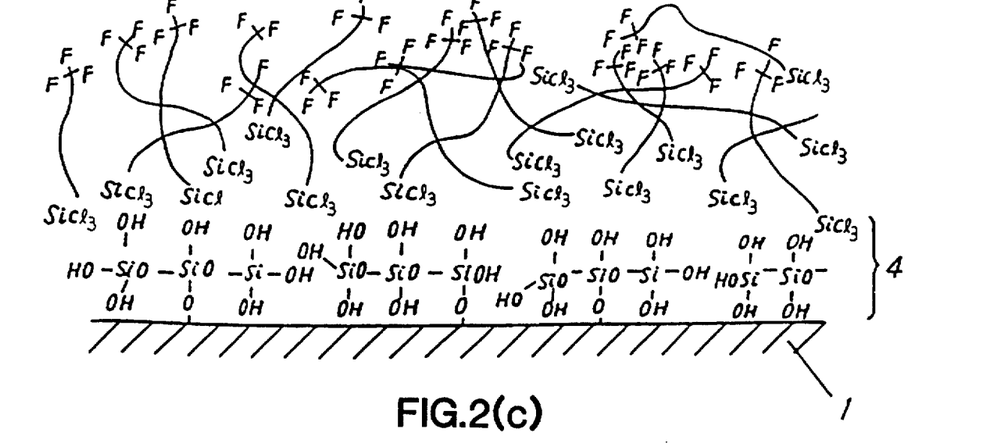
FIG. 2(c) is a schematic sectional view, enlarged in scale to the molecular level showing the fluorocarbon-based monomolecular coating film on the siloxane inner layer of Example 2 of this invention.
Figure 2D:
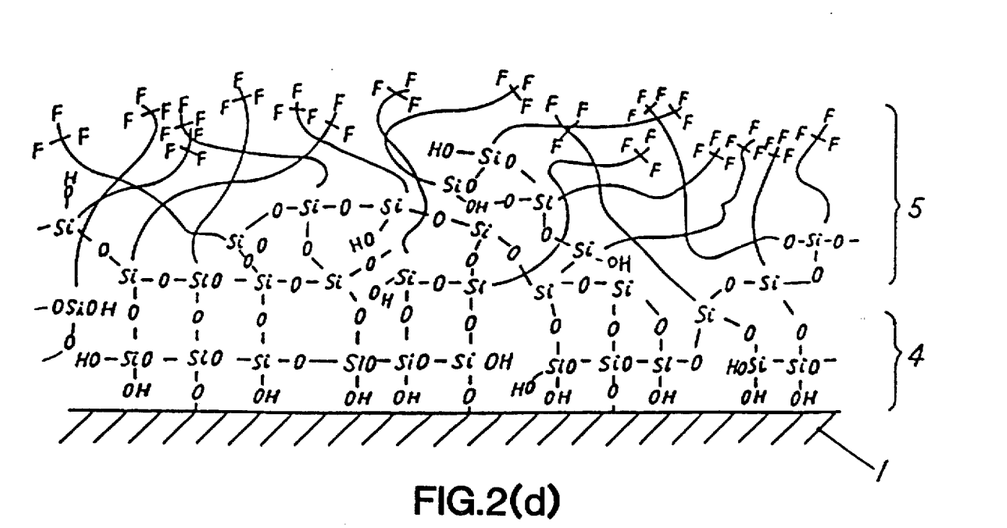
FIG. 2(d) is a schematic sectional view, enlarged in scale to the molecular level showing the fluorocarbon-based polymer film (outer layer) and siloxane monomolecular film (inner layer) on the surface of a substrate of Example 2 of this invention.

Further, a non-aqueous solution containing 80% wt n-hexadecane, 12% wt carbon tetrachloride and 8% wt chloroform was prepared by dissolving into a concentration of 2.0% wt a compound having fluorocarbon group and chlorosilane group such as $CF_3(CF_2)_7(CH_2)_2$ $SiCl_3$ coated on the surface substrate 1 formed on the surface thereof with a monomolecular film 4 having many —SiOH bonds as shown in FIG. 2(c). A reaction was thus brought about between —SiCl bonds and —SiOH groups of the monomolecular layer 4. Then, by baking in an atmosphere containing water moisture at 200° C. for about 30 minutes, the bonds of formula[3] were formed:

In this way, a polymer film 5 having a thickness of 10 to 20 μm was formed such that it was chemically bonded to the inner-layer, i.e., the siloxane polymer monomolecular film 4.

The coating film did not separate in a checkerboard test.

Furthermore, by adding 15% wt of $SiCl_4$ as a compound cross-linking agent to the non-aqueous solution containing a compound having a fluorocarbon group and a chlorosilane group, a fluorocarbon-based polymer coating film having a hardness increased by about 5 times could be obtained. Additionally, by carrying out similar coating using a non-aqueous solution containing a compound having a fluorocarbon group and a chlorosilane group, which was obtained by dispersing about 20% wt of fine particles of a fluorocarbon-based polymer, e.g., polytetrafluoroethylene, a fluorocarbon-based polymer coating film could be obtained that had very superior adhesion compared to that in the prior art although its hardness was comparable to that in the prior art.

While this example used $CF_3CH_2O(CH_2)_{15}$ $SiCl_3$ and $CF_3(CF_2)_7(CH_2)_2SiCl_3$ as the fluorocarbon-based surface active agent, by adding the C=C or C≡C group to or assembling it in an alkyl chain portion, cross-linking can be obtained by irradiation with an electron beam of about 5M-rads after the formation of the coating film, and thus it is possible to increase the hardness of the coating film to about 10 times.

Further, as the fluorocarbon-based surface active agent, materials shown below may be used in addition to the above agents,

EXAMPLE 3

Figure 3A:
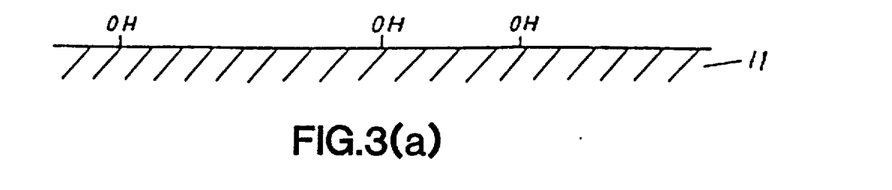
FIG. 3(a) is a schematic sectional view, enlarged in scale to the molecular level showing the surface of a substrate of Example 3 of this invention.

As shown in Example 1, a hydrophilic substrate 11 was prepared as shown in FIG. 3(a).

This substrate 11 was then dipped in a solution obtained by dissolving 1% wt of a material having a chlorosilyl group in a non-aqueous solvent such as a chroloform solvent and then was raised from the solution.

By using Cl—(SiCl$_2$O)$_2$—SiCl$_3$ as a material having a plurality of chlorosilyl groups in a molecule, a hydrochloric acid removal reaction was brought about because of the presence of hydrophilic —OH groups on the surface of the substrate 11, thus fixing molecules to the substrate via —SiO— bonds as shown above formula [1].

Figure 3B:
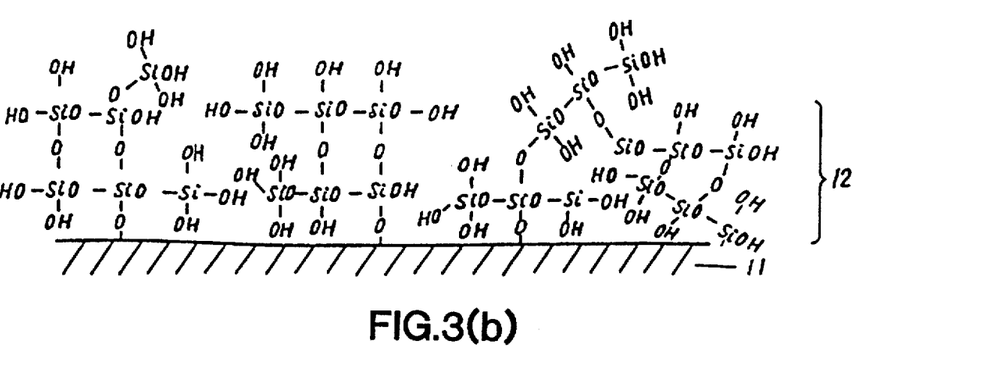
FIG. 3(b) is a schematic sectional view, enlarged in scale to the molecular level showing the siloxane polymer film (inner later) on the surface of a substrate of Example 3 of this invention.

By subsequently evaporating the chloroform solvent in an atmosphere containing of moisture, chlorine in —SiCl groups that remained without being reacted with the substrate 11 were then reacted with the water by a hydrochloric acid removal reaction to form a siloxane polymer coating film 12 as shown in FIG. 3(b).

As the siloxane polymer coating film 12 thus obtained was bonded to the surface of the substrate 11 via chemical bonds of —SiO—, it was difficult to be separated.

The siloxane polymer coating film 12 formed also had many —SiOH bonds on the surface.

Figure 3C:
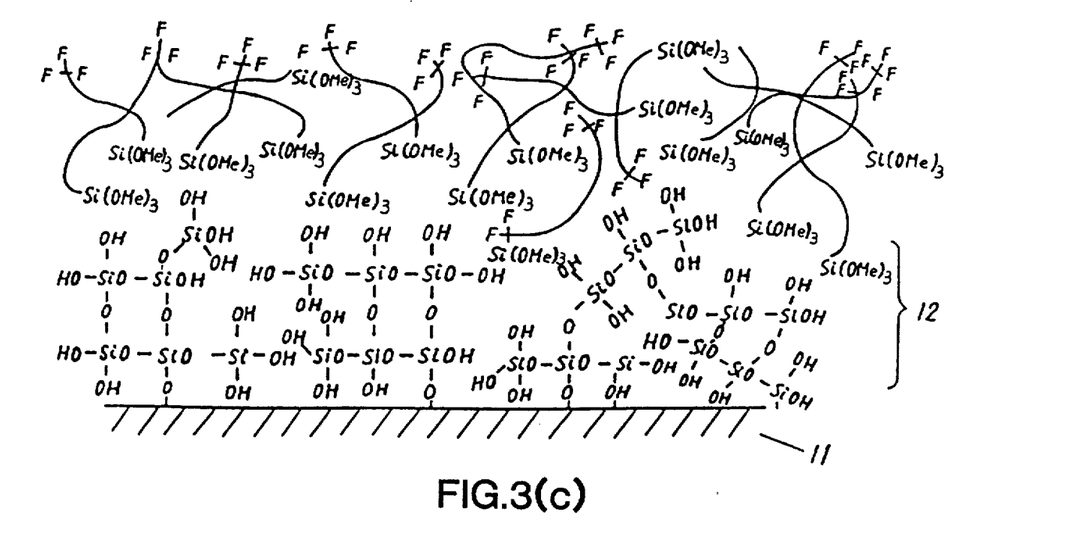
FIG. 3(c) is a schematic sectional view, enlarged in scale to the molecular level showing the fluorocarbon-based polymer film (outer layer) on the siloxane polymer film (inner later) of Example 3 of this invention.

Furthermore, a solution obtained by dissolving a concentration of several percent, for instance 10% wt, of a compound having a fluorocarbon group and a alkoxysilane group, for instance CF$_3$CH$_2$O(CH$_2$)$_{15}$Si(OCH$_3$)$_3$ in an alcohol solvent, for instance ethanol, was used for coating, followed by baking at 200° C. for about 30 minutes. By doing so, —OH groups exposed to the surface of the siloxane polymer coating film 12 were reacted with alkoxy groups in the fluorine-containg alkoxysilane-based surface active agent an alcohol removal reaction to form such as the formula [4].

CF$_3$CH$_2$O(CH$_2$)$_{15}$Si(OCH$_3$)$_3$ + 3(—OH) ——→     formula [4]

Figure 3D:
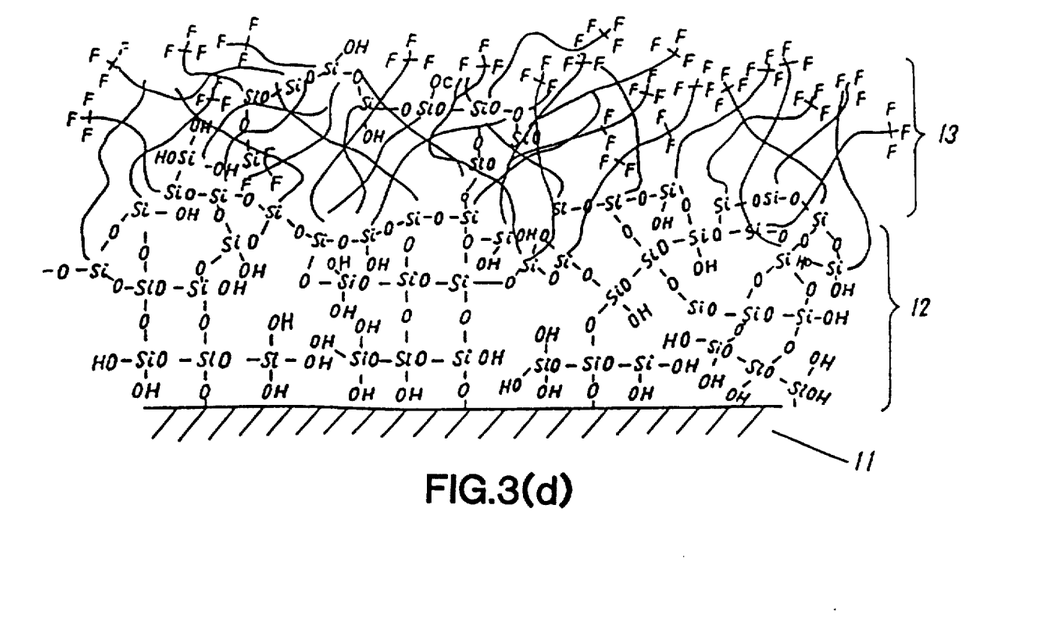
FIG. 3(d) is a schematic sectional view, enlarged in scale to the molecular level showing the fluorocarbon-based polymer film (outer layer) and siloxane polymer film (inner later) on the surface of a substrate of Example 3 of this invention.

In this way, a polymer film 13 having a thickness of 10 to 20 μm was obtained.

This polymer film 13 did not separate in a checkerboard test. Further, by adding 5% wt of Si(OCH$_3$)$_4$ as a crosslinking agent to the solvent containing a compound having a fluorocarbon group and an alkoxysilane group shown by the above formula [4], a three-dimensionally cross-linked fluorocarbon-based film via —SiCl(—O—)$_3$ bonds was obtained, which had about two times the hardness of the film obtained without addition of Si(OCH$_3$)$_4$.

Further, by carrying out similar coating using a solution containing a compound having a fluorocarbon group and an alkoxysilane group, to which 20% wt of fine particles of polytetrafluoroethylene were added as a fluorocarbon-based polymer, a polymer film was obtained, which had a very superior adhesion compared to that in the prior art although its hardness was comparable to that in the prior art.

EXAMPLE 4

Figure 4A:
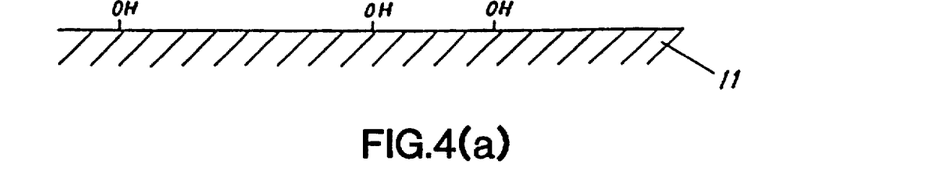
FIG. 4(a) is a schematic sectional view, enlarged in scale to the molecular level showing the surface of a substrate of Example 4 of this invention.

As shown in Example 3, a hydrophilic substrate 11 as shown in FIG. 4(a) was dipped for about one hour in a non-aqueous solution prepared by dissolving 1 % wt of Cl—(SiCl$_2$O)$_2$—SiCl$_3$ as a material containing a chlorosilyl group, for instance, in a chloroform solvent.

Figure 4B:
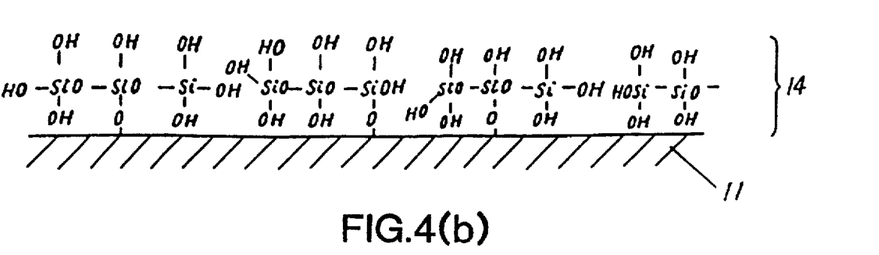
FIG. 4(b) is a schematic sectional view, enlarged in scale to the molecular level showing the siloxane polymer (inner layer) on the surface of a substrate of Example 4 of this invention.

At this time, hydrochloric acid removal reaction occured on the surface of substrate 11 because of the presence of hydrophilic —OH groups on the surface. Thus, molecules were adsorbed as shown by the formula such as formula [1]. When the substrate was exposed to an atmosphere containing water, a siloxane monomolecular film 14 as shown in FIG. 4(b) was obtained on the substrate surface, and shown such as the formula [5] and/or formula [6] etc.

The monomolecular layer 14 thus obtained did not separate as it was perfectly bonded to the substrate 1 via —SiO— chemical bonds.

The monomolecular layer 14 obtained also had many —SiOH bonds.

Figure 4C:
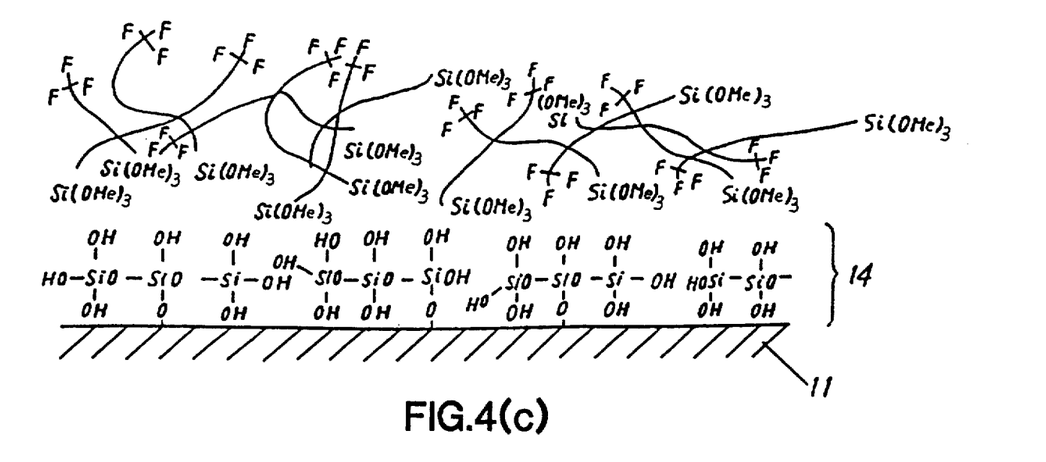
FIG. 4(c) is a schematic sectional view, enlarged in scale to the molecular level showing the fluorocarbon-based polymer film (outer layer) on the siloxane polymer film (inner later) of Example 4 of this invention.

Further, a solution was prepared by dissolving a concentration of 2% wt CF$_3$(CF$_2$)$_7$(CH$_2$)$_2$Si(OC$_2$H$_5$)$_3$ as a compound having a fluorocarbon group and an alkoxysilane group in a methanol solvent, coated onto the surface of substrate 11 covered with a monomolecular film having many —SiOH bonds, and followed by baking at 200° C. for about 30 minutes.

Figure 4D:
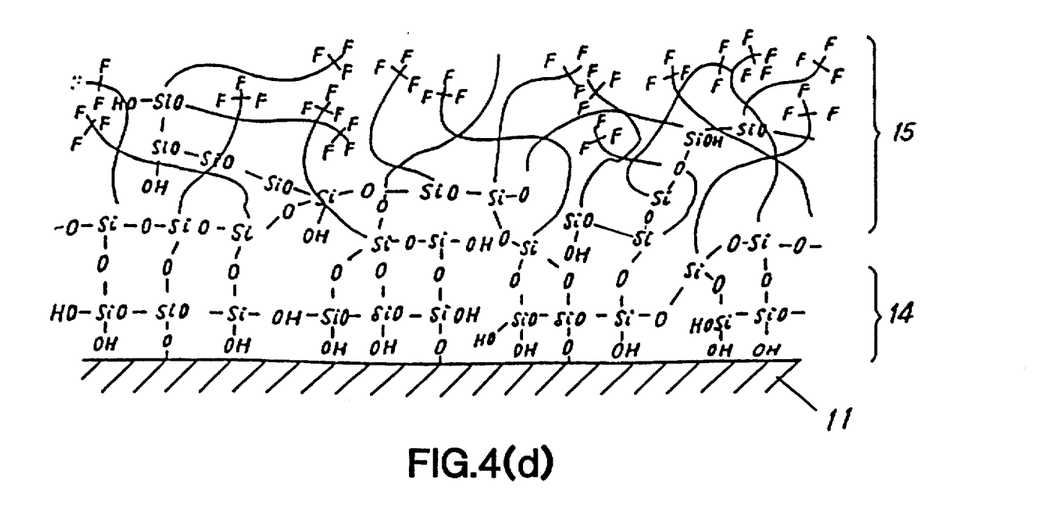
FIG. 4(d) is a schematic sectional view, enlarged in scale to the molecular level showing the fluorocarbon-based polymer film (outer layer) and siloxane polymer film (inner later) on the surface of a substrate of Example 4 of this invention.

This produced the compound shown in FIG. 4(d) and represented by formula[7].

In this way, a polymer film 15 having a thickness of 10 to 20 μm was obtained.

The polymer film 15 formed did not separate in a checkerboard test, because it was formed in a state chemically bonded to the siloxane monomolecular film 14.

Further, by adding 10% wt of Si(OC$_3$H$_7$)$_4$ as the crosslinking agent to the solution having a compound containing a fluorocarbon group and an alkoxysilane group, a fluorocarbon-based coating film having about four times the hardness of the film was obtained as compared to a film without the addition of the agent. Furthermore, by carrying out similar coating using a solution containing a compound having a fluorocarbon group and an alkoxysilane group, in which solution was dispersed 20% wt of fine particles of polytetrafluoroethylene, a fluorocarbon-based coating film was obtained, which had a very superior adhesion compared to that in the prior art although its hardness was comparable to that in the prior art.

Although in the above Examples 3 and 4, CF$_3$CH$_2$O(CH$_2$)$_{15}$Si(OCH$_3$)$_3$ and were CF$_3$(CF$_2$)$_7$(CH$_2$)$_2$Si(OC$_2$H$_5$)$_3$ were used as a reagent for forming a fluorocarbon-based film on the uppermost surface by adding or assembling the C═C or C≡C group to or in the alkyl chain portion, cross-linking can be caused by irradiation of an electron beam of about 5M-rads. After the formation of the coating film, a coating film with about 10 times of the hardness to be obtained.

Further, as the compound having a fluorocarbon group and a chlorosilyl group or a fluorocarbon group and an alkoxysilane group, CF$_3$(CH$_2$)$_2$Si(CH$_3$)$_2$(CH$_2$)$_{15}$Si(OC H$_3$)$_3$, F(CF$_2$)$_4$(CH$_2$)$_2$Si(CH$_3$)$_2$(CH$_2$)$_9$ Si(OCH$_3$)$_3$ and CF$_3$COO(CH$_2$)$_{15}$Si(OC$_2$H$_5$)$_3$ may be used, in addition to the compounds noted in the above Examples 1 to 4.

The invention may be embodied in other specific forms without departing from the spirit or essential characteristics thereof. The present embodiment is to be considered in all respects as illustrative and not restrictive. The scope of the invention is indicated by the appended claims rather than by the foregoing description, and all changes which come within the meaning and range of equivalency of the claims are intended to be embraced therein.

We claim:

1. A method of manufacturing a fluorocarbon-based polymer coating film comprising the steps of:

contacting a substrate having a surface containing hydroxyl groups with a non-aqueous solvent comprising a material comprising chlorosilyl groups;

coating the substrate surface with either (1) a non-aqueous solvent comprising a compound comprising a fluorocarbon group and a chlorosilyl group or (2) a solvent comprising (a) a compound comprising a fluorocarbon group, and an alkoxysilane group or (b) a compound of the following formula:

$$CF_3-(CF_2)_n-(R)_m-SiY_q(OA)_{3-q}$$

where n represents 0 or an integer; R represents an alkyl group or a hydrocarbon substituted group containing C=C or C≡C, a silicon atom or an oxygen atom; m represents 0 or 1; Y represents a hydrogen atom, an alkyl group, an alkoxy group, a fluorine-containing alkoxy group or a fluorine-containing alkyl group; A represents a hydrogen atom; and q represents 0, 1 or 2; and baking the substrate after said contacting step and coating step.

2. The method of manufacturing the fluorocarbon-based polymer coating film according to claim 1, wherein the substrate is made of the member of a group consisting of metals, plastics, and ceramics.

3. The method of manufacturing the fluorocarbon-based polymer coating film according to claim 1, wherein the substrate is mace of a plastic material treated in a plasma atmosphere containing oxygen.

4. The method of manufacturing the fluorocarbon-based polymer coating film according to claim 1, wherein said material comprising chlorosilyl groups comprises a member of the group consisting of $SiCl_4$, $SiHCl_3$, $SiH_2Cl_2$ and $Cl-(SiCl_2O)_n-SiCl_3$, wherein n is an integer.

5. A method of manufacturing the fluorocarbon-based polymer coating film according to claim 1, wherein said compound having a fluorocarbon group and a chlorosilyl group is represented by a formula: $CF_3-(CF_2)_n-(R)_m-SiX_pCl_{3-p}$ where n represents 0 or an integer; R represents an alkyl group or a hydrocarbon substituted group containing C=C or C≡C, a silicon atom or an oxygen atom; m represents 0 or 1, X represents a hydrogen atom, an alkyl group, an alkoxy group, a fluorine-containing alkoxy group or a fluorine-containing alkyl group; p represents 0, 1 or 2.

6. A method of manufacturing the fluorocarbon-based polymer coating film according to claim 1, wherein said compound (a) is represented by a formula:

$$CF_3-(CF_2)_n-(R)_m-SiY_{q'}(OA')_{3-q'}$$

where n represents 0 or an integer;

R represents an alkyl group or a hydrocarbon substituted group containing C=C or C≡C, a silicon atom or an oxygen atom;

m represents 0 or 1;

Y represents a hydrogen atom, an alkyl group, an alkoxy group, a fluorine-containing alkoxy group or a fluorine-containing alkyl group;

OA' represents an alkoxy group; and q' represents 0, 1 or 2.

7. A method of manufacturing the fluorocarbon-based polymer coating film according to claim 1, wherein a material represented by a formula: $SiX_sCl_{4-s}$ where X represents a hydrogen atom or an alkyl group, and s represents 0, 1 or 2; is added to the non-aqueous solvent containing the compound having a fluorocarbon group and a chlorosilyl group.

8. The method of manufacturing the fluorocarbon-based polymer coating film according to claim 1, wherein a material represented by a formula:

$$SiY_t(OA'')_{4-t}$$

where Y represents an alkyl group; A" represents a hydrogen atom or an alkyl group; and t represents 0, 1, and 2; is added to the solvent of (2).

9. The method of manufacturing the fluorocarbon-based polymer coating film according to claim 1, wherein fine particles of a fluorocarbon-based polymer are dispersed in advance in either said non-aqueous solvent containing the compound having a fluorocarbon group and a chlorosilyl group or said solvent containing the compound having a fluorocarbon group and an alkoxysilane group.

10. A method of manufacturing a fluorocarbon-based polymer coating film comprising the steps of:

contacting a substrate having a surface containing hydroxyl groups with a non-aqueous solvent comprising a material comprising chlorosilyl groups;

washing the substrate with a non-aqueous solvent to remove unreacted material;

coating the substrate surface with either (1) a non-aqueous solvent comprising a compound comprising a fluorocarbon group and a chlorosilyl group or (2) a solvent comprising (a) a compound comprising a fluorocarbon group, and an alkoxysilane group or (b) a compound of the following formula:

$$CF_3-(CF_2)_n-(R)_m-SiY_q(OA)_{3-q}$$

where n represents 0 or an integer; R represents an alkyl group or a hydrocarbon substituted group containing C=C or C≡C, a silicon atom or an oxygen atom; m represents 0 or 1; Y represents a hydrogen atom, an alkyl group, an alkoxy group, a fluorine-containing alkoxy group or a fluorine-containing alkyl group; A represents a hydrogen atom; and q represents 0, 1 or 2; and baking the substrate after said contacting step and coating step.

11. A method of manufacturing the fluorocarbon-based polymer coating film of claim 1, further comprising:

irradiating with an electron beam of about 5M-rads when the fluorocarbon group of the coating step comprises C=C or C≡C bonds, which irradiation is performed subsequent to the coating step and prior to the baking step.

* * * * *